United States Patent [19]
Delude

[11] Patent Number: 5,891,545
[45] Date of Patent: Apr. 6, 1999

[54] BLANK CONSTRUCTION FOR A FOOT ORTHOTIC

[75] Inventor: Steven W. Delude, Hanson, Mass.

[73] Assignee: Gleason's Orthotics Inc., Lexington, Mass.

[21] Appl. No.: 840,289

[22] Filed: Apr. 14, 1997

[51] Int. Cl.⁶ ..................................................... B32B 3/14
[52] U.S. Cl. ........................... 428/78; 428/189; 428/515; 36/43; 36/44; 36/93; 36/154
[58] Field of Search ............... 428/78, 515, 189; 36/88, 43, 44, 93, 153, 154

[56] References Cited

U.S. PATENT DOCUMENTS

| | | | |
|---|---|---|---|
| 4,503,576 | 3/1985 | Brown | 12/146 M |
| 4,661,535 | 4/1987 | Borroff et al. | 523/105 |
| 4,688,338 | 8/1987 | Brown | 36/44 |
| 4,784,123 | 11/1988 | Robeson | 128/90 |
| 4,803,747 | 2/1989 | Brown | 12/142 N |
| 4,813,090 | 3/1989 | Ibrahim | 12/142 N |
| 5,312,669 | 5/1994 | Bedard | 428/105 |
| 5,338,600 | 8/1994 | Fitchmun et al. | 428/213 |
| 5,797,862 | 8/1998 | Lamont | 602/10 |

*Primary Examiner*—Paul Thibodeau
*Assistant Examiner*—H. Rickman
*Attorney, Agent, or Firm*—Paul J. Cook

[57] ABSTRACT

A blank construction for a foot orthotic is formed of a first section and a second section smaller than the first section and which is joined to the first section. The first section has a shape generally the same as a bottom inside surface of a shoe. The blank construction is heat softened at a temperature between about 65° C. and about 85° C. at a pressure up to about 5 psig.

7 Claims, 3 Drawing Sheets

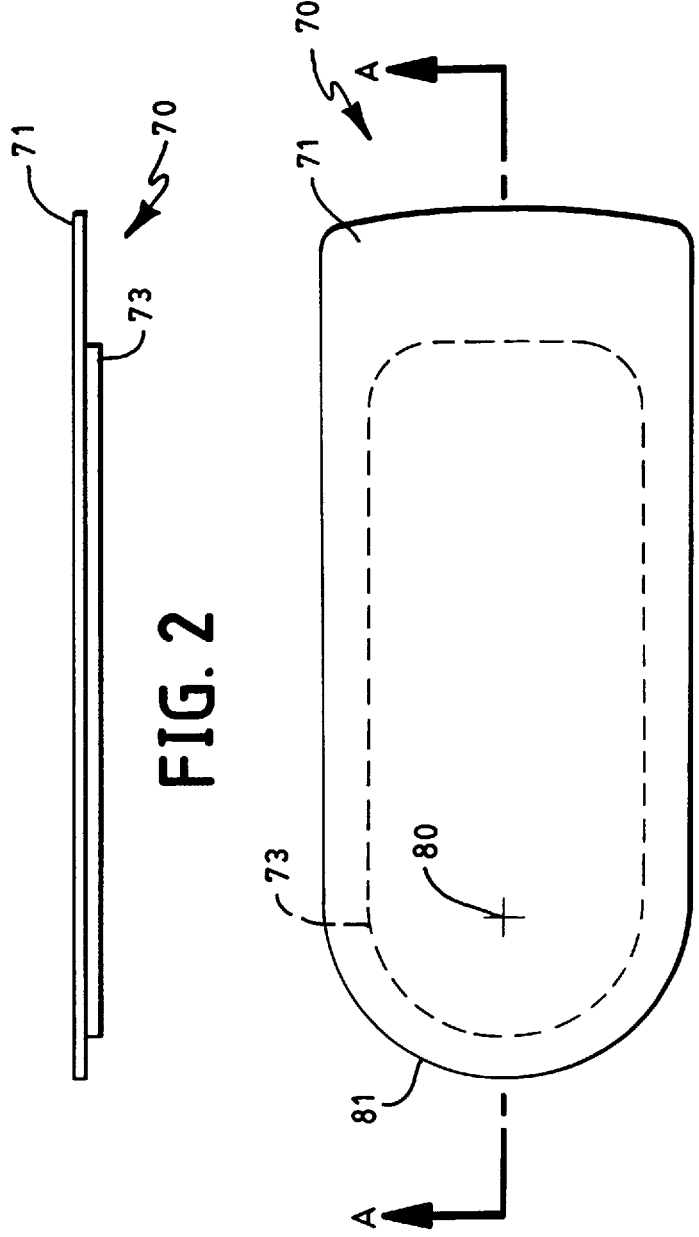

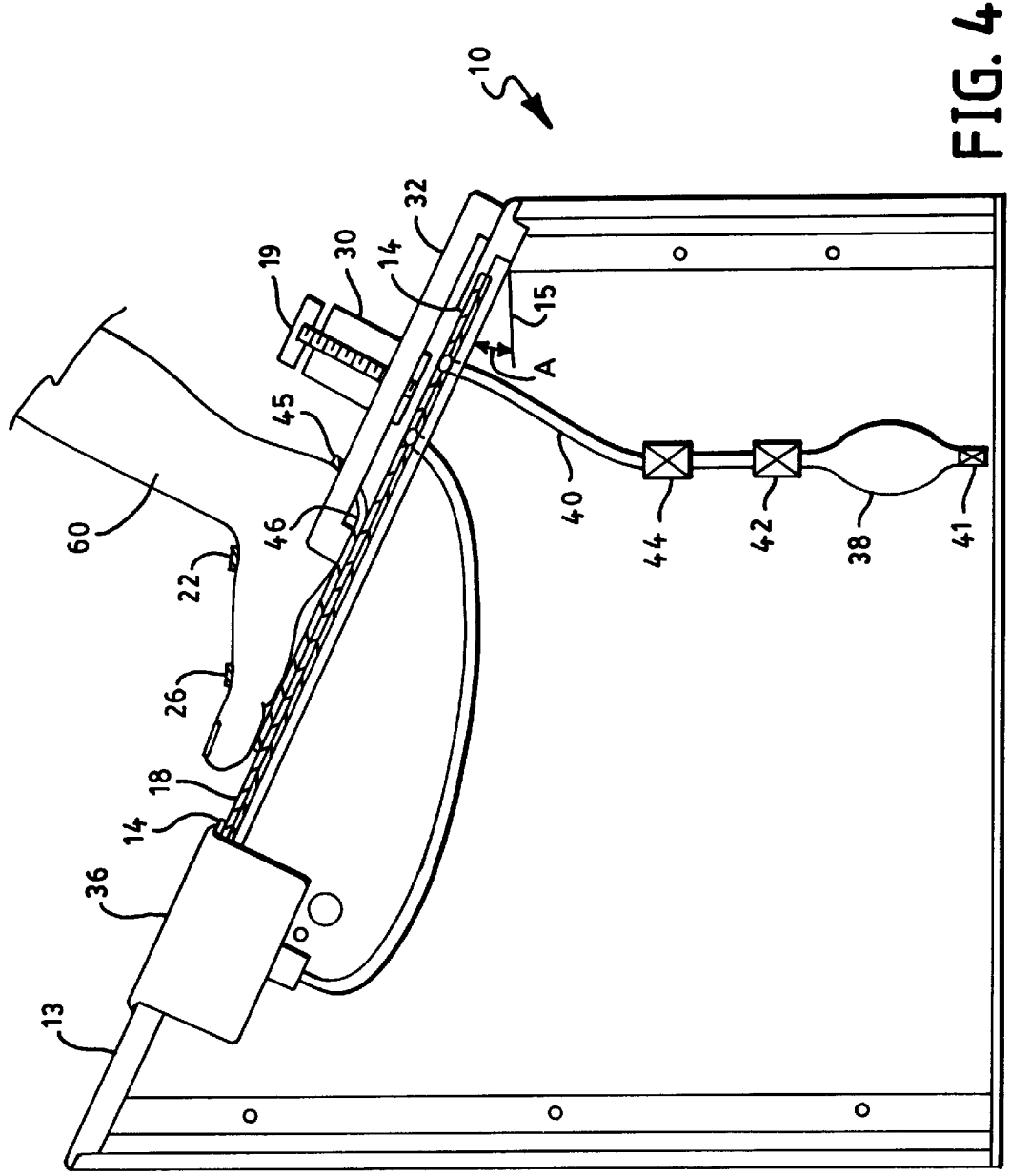

BLANK CONSTRUCTION FOR A FOOT ORTHOTIC

BACKGROUND OF THE INVENTION

This invention relates to a blank construction for making corrected custom orthopedic devices, or orthoses, for the foot can be fabricated. Such devices are commonly referred to as "foot orthotics".

The human foot is formed of a complex array of twenty-six bones. The human foot performs two main functions, support and locomotion. Ideally, the foot functions as a tripod, supporting the body's weight on the heel and across the metatarsal arch. The foot is capable of a wide range of movement. Under stressed conditions, one of the most important of these movements is the side to side rotation of the foot, either to the outside ("supination") or to the inside ("pronation"). This rotation increases or decreases the height of the foot's arch, and if excessive, can put the foot in a weakened, unbalanced, condition. The foot is said to be in a "neutral" position when it is neither pronated nor supinated, i.e., then the heel bone is vertical and is directly in line with the talus bone above it. The neutral position provides good skeletal support for the body's weight.

It is well known that activities which involve movement of the body, including walking, running, skiing, and skating, place very large stresses on the bones and joints of the leg and the foot. These stresses are larger when the bones and joints of the foot are not in the proper position, and are maximized when the knee is additionally out of proper alignment.

Improper foot structure and position have been treated in part through custom-molded foot orthotics which fit into the shoes and which support the foot, or parts of the foot, in a "corrected" position. This corrective function of a foot orthotic distinguished it from a mass-produced foot pad or other shoe insert designed strictly for comfort.

Orthotics are made from a custom impression or image of the foot. Impressions are typically made by plaster casting or by a mold of low density foam. Images of the feet also can be made by scanning or digitizing the foot and capturing that data in a computer database. Impressions are usually made with the subtalar joint in the neutral position. Depending on the process used, impressions can be taken in a weight bearing, semi-weight bearing or non-weight bearing position. At this point, generally through a practitioner's diagnosis, adjustments will be made to the impression or image to correct for biomechanical deficiencies. These adjustments are referred to as 'postings'.

Postings can be placed into two general categories. Postings which involve modifications to the foot form are generally considered intrinsic postings as making an excavation in the foot form to accommodate a dropped metatarsal head. The result is a positive metatarsal lift in the orthotic molded over this form. The opposite type of posting is referred to as extrinsic. An example of this modification is to place a pad on the foot form directly over the dropped metatarsal head. An orthotic molded over this form has a relief pocket under the metatarsal head.

Other modifications can be added to an orthotic. These include but are not limited to rearfoot and forefoot wedges, heel lifts and metatarsal raise pads.

Orthotics can be fabricated either manually or by an automated process. Typically, a laboratory is used to fabricate the appliance. Most labs have cast scanning capability that work either with their own milling machine or a downstream miller. Due to the high cost of CAD-CAM milling, labs may not be able to afford their own miller. Central or shared fabrication facilities are common. Relay stations exist which scan and modem data to a central fabrication facility. Quite often casts are being measured, interpreted and then milled in three different sites and quite possibly by three different organizations. Usually, three or four visits to the medical practitioner are required while the shape of the patient's foot adjusts to the orthotic in use to progress to a final foot shape most comfortable to the patient.

A wide spectrum of materials are available to the practitioner to fabricate an orthotic. All orthotic materials have a certain degree of flexibility and a certain degree of rigidity. Materials as common as leather and cork can be used to fabricate orthotics. Other materials such as ethylene vinyl acetate (EVA), polyethylene and polypropylene are employed. These materials can be used alone or in combination with each other. Also important to the function of the orthotic is thickness and form.

There are several problems associated with the existing methods for fabricating foot orthotics. The single largest disadvantage is the impression processes employed. They do little to change the positioning and/or alignment of components of the foot. The molding and scanning processes used simply duplicate the structure of the foot. All modifications are done through the evaluation of the practitioner. Education and experience aid a practitioner in making proficient adjustments. However, these adjustments are still based on judgement.

Another disadvantage to the present processes is the time delay associated with fabricating the orthotic. Once the impression of a person's feet have been taken, a wait of several days or even several weeks is usually required before the orthotic is finished. When a patient has come to a practitioner with a foot problem, they usually require a remedy as soon as possible.

The break-in period associated with most presently available orthotics is also a disadvantage. Since modifications and adjustments to the impression are based on the inexact ability and judgement of the practitioner, the fabricated orthotic is often too uncomfortable for a person to wear for long periods of time when they first begin to wear it. Often, patients are told to wear the orthotics for short periods of time every day, increasing the amount of time over a period of weeks.

A foot orthotic must be suffiently flexible to provide comfort to the patient when positioned in the patient's shoe and must be sufficiently stiff to provide support under the weight of the patient during normal use of the patient. Foot orthotic blanks are disclosed in U.S. Pat. Nos. 4,813,090; 4,503,576 and 4,803,747. A method and apparatus for forming a foot orthotic is described in U.S. Pat. No. 1,044,171.

Accordingly, it would be desirable to provide a blank for a foot orthotic which conforms with the entire weight supporting surface of the foot. Furthermore, it would be desirable to provide such a foot orthotic which can be easily adjusted to a variety of foot sizes. Also, it would be desirable to provide such a foot orthotic which is sufficiently flexible to provide comfort to a patient and which is sufficiently stiff to promote support to the patient to provide therapy for the patient.

SUMMARY OF THE INVENTION

The present invention provides a blank for a foot orthotic. The foot orthotic is formed from one or two sections. A first section has an initial shape substantially conforming to the inside bottom surface of a patient's shoe. The second section is attached to the first section on a surface opposite to the surface which contacts the patient's foot. The second section increases the stiffness of the blank which, in its final shaped form provides support for the orthotic to retain its shape under the weight of the patient during use. The blank can be formed by an apparatus which exerts pressure on the blank when it is heat softened so that the softened blank can be conformed to the bottom surface of the patient's foot.

In the blank forming step, the orthotic blank is heated to above its heat deformation temperature and is positioned between a bladder and a seated patient's foot. A hand held bulb then is hand-squeezed to inflate the bladder to a pressure such that the blank is deformed to a form and position comfortable to the patient. Bladder inflation then is stopped and the formed blank is allowed to cool to a temperature below its heat deformation temperature. The pressure at which bladder inflation is stopped is noted from the gauge which indicates the bladder pressure. The release valve then is opened to allow the pressure within the bladder to be reduced to substantially atmospheric pressure. The apparatus then is in condition for a repeated operation to form a second foot orthotic.

BRIEF DESCRIPTION OF THE DRAWINGS

FIG. 1 is a top view of an orthotic blank useful with the present invention.

FIG. 2 is a cross sectional view of the blank of FIG. 1 taken along line A—A.

FIG. 4 is a cross-section view of the apparatus of FIG. 3 showing the connection between a bladder and a hand held pressurizing bulb.

DESCRIPTION OF SPECIFIC EMBODIMENTS

Figure 3:
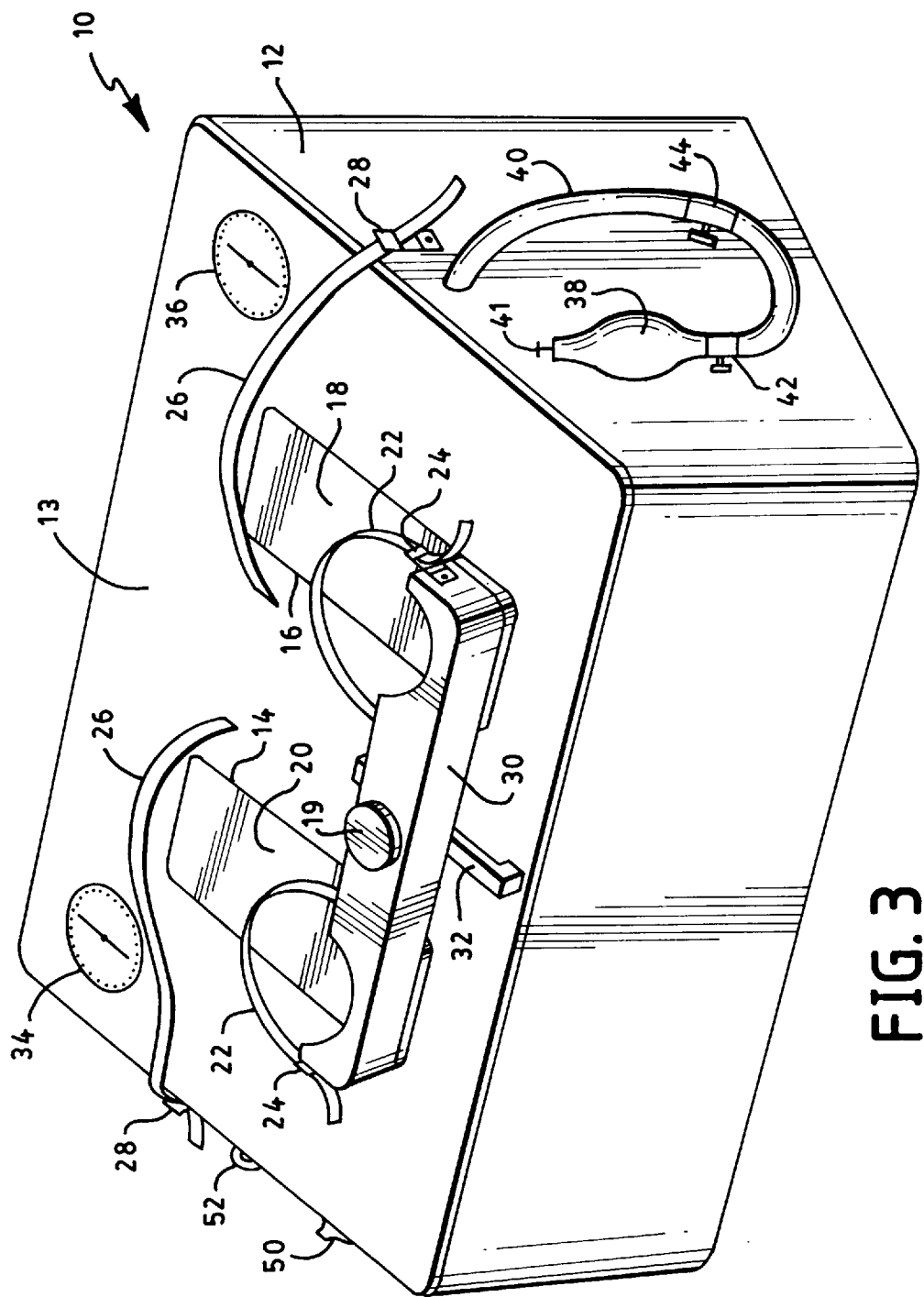
FIG. 3 is an isometric view of the apparatus useful for forming the blank of this invention.

The blank of this invention is formed of two sections which can be formed of a unitary construction or from two pieces adhered together. A first section has a shape which generally conforms to the shape of a bottom interior surface of a shoe. A second section comprises a stiffening element having a length and width less than the first section. The first section has a thickness which provides support to the patient without the need for further working it such as by skiving or the like, other than shaping it under heat and pressure. The second section provides additional stiffness to the first section while avoiding excessive thickness of the overall blank. This construction provides the desired shape conformation to the bottom surface of the patient's foot while also providing adequate support to the patient during use of the orthotic. In addition, the blank has a softening temperature, preferably between about 1 and 2 psig so that it can be deformed at low pressures of about 5 psig or less of between about 65° C. and about 85° C. The blank, after being formed, then has a nondeformable shape at normal room temperature.

The blank of this invention can be conformed to the bottom of a patient's foot to effect repositioning the metatarsal bones by working in conjunction with the foot muscles. The pressures created by an inflated bladder distribute the forces in a manner consistent with the foot's natural shape. The blank of this invention eliminates the need to manually incorporate postings or additions and wedges. By repositioning the metatarsals, the calcaneus returns to a normal position. In turn, this provides correct alignment of the subtalar component and therefore the entire body posture.

After the initial fitting of the blank to form the foot orthotic, the patient typically requires two additional adjustments. Adjustments are made by taking a new impression either from the previously formed orthotic or a new orthotic blank with the inflated bladder. The typical time frame between an initial fitting and subsequent adjustments is two to three weeks. This allows time for the muscles in the foot to work in conjunction with the orthotic to bring the metatarsals back to a more normal position.

Referring to FIGS. 1 and 2, a blank 70 is useful with the method and apparatus of this invention is illustrated. The blank includes two elements 71 and 73 adhered together or a single element shaped as shown. The first element 71 is shaped to the general shape of the interior bottom surface of a shoe. It is of necessity thin, i.e., between about 1/32 and about 3/32 inch thick. The first element 71 is stiffened by second element 73 which has a thickness between about 3/32 and about 5/32 inch. The width of the second element 73 is between about 70% and about 100%, preferably between about 70% and about 80% of the width of the first element and a length between about 75% and about 85% of the length of the first element. The blank 70 is formed of a material having a softening temperature between about 65° C. and about 85° C., preferably between about 70° C. and about 80° C. The blank is formed from a heat softenable polymeric composition such as polyethylene, polypropylene, ethylene vinyl acetate (EVA), transpolyisoprene or the like, preferably transpolyisoprene composition such as is available from Smith & Nephew Rolyan, Inc. (Germantown, Wis.) under the tradename San-Splint. The diameter of the curved heel section 81 from center 80 of the first element is between about 1 and about 1½ inch, preferably between about 1⅛ and 1⅜. The diameter of the curved heel section 83 of the second element from center 80 is between about ¾ and about 1⅛ inch, preferably between about ⅞ and 1⅛ inch.

Referring to FIGS. 3 and 4, the apparatus of this invention 10 includes a housing 12 having a top plate 13. Top plate 13 is positioned at an angle A between about 20° and 40° from the horizontal 15 so that a seated patient exerts little or no body weight, other than the weight of the foot on a bladder 18 or 20. This position provides comfort for the patient and accuracy of orthotic fit. Inflatable bladders 18 and 20 are received within housing openings 14 and 16. Straps 22 and buckles 24 are positioned to secure an ankle and straps 26 and buckles 28 are positioned to secure a toe section of a foot. A heel support 30 is slideably mounted on slide bar 32. The position of heel support 30 is adjusted by loosening thumb screw 19 to accommodate feet of varying sizes on bladders 18 and 20. When the desired foot position is established, screw 19 is tightened to set the position of heel support 30. Gauge 36 is connected to the interior of bladder 18 through conduit 40 and indicates the pressure within bladder 18, typically between 0 and about 3 psig. Gauge 34, of the same type as gauge 36, indicates the pressure within bladder 20.

Hand held compression bulb 38, made of a flexible material such as rubber, is in fluid communication with conduit 40 which, in turn is in fluid communication with the interior of bladder 18. Shut off valve 44 is opened while one way valve 41 is closed when the pressure on bulb 38 is increased to admit pressurized gas into conduit 40. When pressure on bulb 38 is decreased or eliminated, release valve 42 is closed to prevent pressurized gas from exiting bladder 18 and one way valve 41 is open to admit gas into the compression bulb 38. After the desired pressure in bladder 18 is attained, shut off valve 44 is closed. After which time a heat-softened orthotic blank 46 (FIG. 2) becomes hardened so that it is nondeformable at room temperature, shut off valve 44 and release valve 42 are opened to decrease pressure within bladder 18 to about atmospheric pressure.

As described above with reference to bulb 38 and bladder 18, bulb 50, connected to conduit 52 is also in fluid communication with one way valves, and a release valve which function as described above with reference bulb 38, valves 42 and 44 and bladder 18. Gauge 34 indicates pressure within bladder 20 and is of the same type as gauge 36.

Referring to FIG. 4, a method for forming a foot orthotic of this invention is described. A blank 46 for a foot orthotic previously heated to above its softening temperature is placed on bladder 18. The blank can be conveniently heated by immersing it in hot water or the like. A patient's foot 60 is positioned on the softened blank. The position of the heel rest 30 is moved when adjustable thumb screw 19 is loosened and is moved on slide bar 32. The foot 60 is positioned securely by straps 26 and 22. Bulb 38 then is hand squeezed to increase pressure within bladder 18 until the heated blank 46 conforms to the bottom surface of the foot 60 and positively raises the bony or structural parts of the foot including the arch. The bladder pressure is maintained until the formed blank is cooled below its heat softening temperature. The formed orthotic thus conforms to the shape of the bottom of foot 60 after the impaired bony and structural parts of the foot are raised at normal room temperature. The straps 22 and 26 are released to free the foot 60 and the pressure in bladder 18 is reduced by opening release valve 42 and shut off valve 44.

What is claimed is:

1. A blank construction for a foot orhotic consisting of:

a first section shaped to conform generally to a shape of a bottom inside surface of a shoe, a second section extending from a surface of said first section; said second section having a length between about 75% and about 85% of the length of said first section and a width between about 70% and about 80% of the width of said first section, said first section and said second section being formed of the same polymeric composition, and blank being deformable at a pressure up to about 5 psig when heated to a temperature between about 70° C. and about 80° C. and being nondeformable at normal room temperature.

2. The blank of claim 1 wherein said first section and said second section are formed as a single piece.

3. The blank of claim 1 wherein said first section and said second section arc formed separately and then are joined together prior to being formed into a shaped foot orthotic.

4. The blank of claim 1 wherein said blank is formed of a polytransisoprene composition.

5. The blank of claim 2 wherein said blank is formed of a polytransisoprene composition.

6. The blank of claim 3 wherein said blank is formed of a polytransisoprene composition.

7. The blank of claim 1 wherein said first section has a thickness between about 3/32 inch and about 5/32 inch and second section has a thickness between about 3/32 inch and 5/32 inch.

* * * * *